US012627665B2

(12) United States Patent
Oduwaiye et al.

(10) Patent No.: US 12,627,665 B2
(45) Date of Patent: May 12, 2026

(54) ADMITTING AN ENTITY COMPUTING DEVICE TO A NETWORK BASED ON A SIGNAL STRENGTH AND NETWORK CONDITIONS

(71) Applicant: Charter Communications Operating, LLC, St. Louis, MO (US)

(72) Inventors: Muhib T. Oduwaiye, Aurora, CO (US); Ravi Kiran Gundu, Georgetown, TX (US); Arvind Kumar Kopparapu, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 299 days.

(21) Appl. No.: 18/356,085

(22) Filed: Jul. 20, 2023

(65) Prior Publication Data

US 2025/0030688 A1 Jan. 23, 2025

(51) Int. Cl.
| | |
|---|---|
| *H04W 24/02* | (2009.01) |
| *H04B 17/318* | (2015.01) |
| *H04L 9/40* | (2022.01) |
| *H04W 24/08* | (2009.01) |
| *H04W 48/12* | (2009.01) |

(52) U.S. Cl.
CPC ........... *H04L 63/10* (2013.01); *H04B 17/318* (2015.01); *H04W 24/02* (2013.01); *H04W 24/08* (2013.01); *H04W 48/12* (2013.01)

(58) Field of Classification Search
CPC ..... H04W 24/02; H04W 36/08; H04W 48/20; H04W 48/18; H04W 52/245; H04W 72/541; H04W 72/542
See application file for complete search history.

(56) References Cited

U.S. PATENT DOCUMENTS

| | | | | |
|---|---|---|---|---|
| 2005/0271021 | A1* | 12/2005 | Alemany | H04W 48/20 370/338 |
| 2016/0037458 | A1* | 2/2016 | Ponnuswamy | H04W 52/241 370/338 |
| 2016/0277160 | A1* | 9/2016 | Lim | H04W 52/46 |
| 2018/0027518 | A1* | 1/2018 | Sugumaran | H04W 64/00 370/328 |
| 2021/0274426 | A1* | 9/2021 | Grayson | H04M 15/60 |

OTHER PUBLICATIONS

Author Unknown, "How iOS, iPadOS and macOS decide which wireless network to auto-join," Apple Support, https://support.apple.com/en-au/HT202831, Jun. 28, 2023, 2 pages.

* cited by examiner

*Primary Examiner* — Tom Y Chang
(74) *Attorney, Agent, or Firm* — Dority & Manning, P.A.

(57) ABSTRACT

A method for admitting an entity computing device to a network includes receiving, by a network computing device, a request from an entity computing device for admission to a network and the network computing device determining whether a signal strength associated with the entity computing device satisfies a signal strength threshold value. In response to determining the signal strength associated with the entity computing device satisfies the signal strength threshold value, the network computing device determines whether one or more network conditions associated with the network are satisfied, and in response to determining the one or more network conditions associated with the network are satisfied, the network computing device admits the entity computing device to the network.

16 Claims, 5 Drawing Sheets

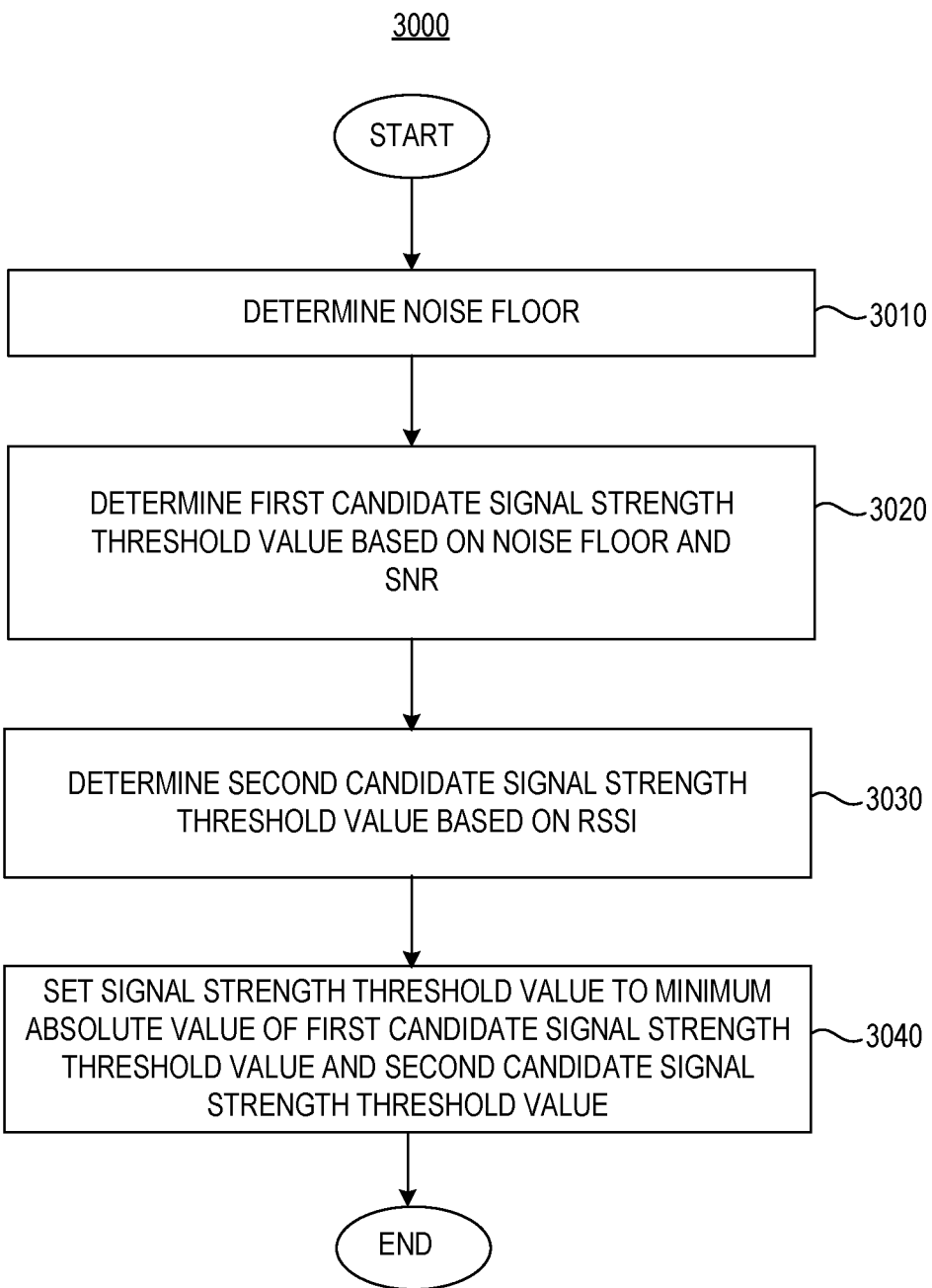

3000

START

DETERMINE NOISE FLOOR — 3010

DETERMINE FIRST CANDIDATE SIGNAL STRENGTH THRESHOLD VALUE BASED ON NOISE FLOOR AND SNR — 3020

DETERMINE SECOND CANDIDATE SIGNAL STRENGTH THRESHOLD VALUE BASED ON RSSI — 3030

SET SIGNAL STRENGTH THRESHOLD VALUE TO MINIMUM ABSOLUTE VALUE OF FIRST CANDIDATE SIGNAL STRENGTH THRESHOLD VALUE AND SECOND CANDIDATE SIGNAL STRENGTH THRESHOLD VALUE — 3040

END

FIG. 3

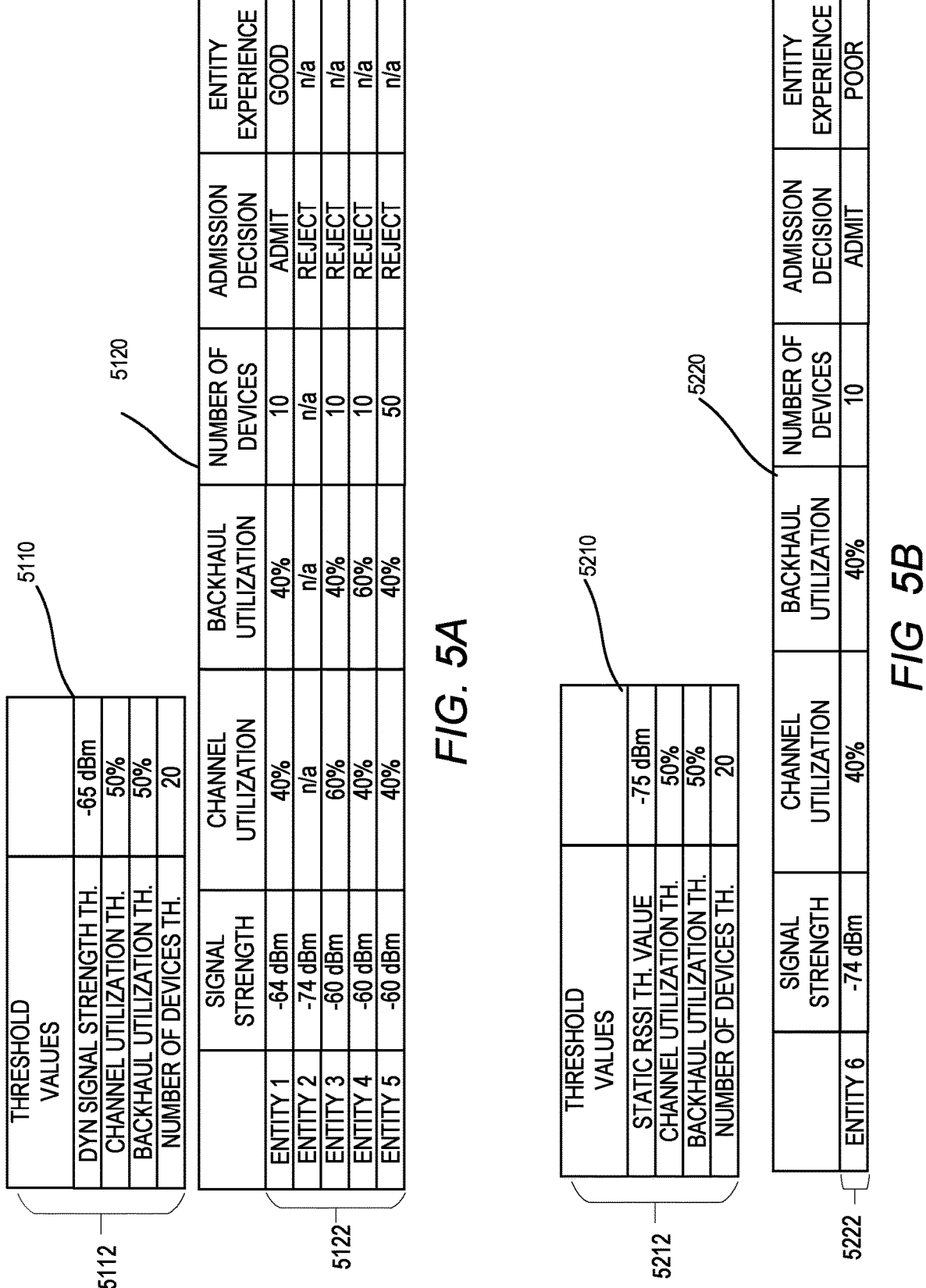

THRESHOLD VALUES 5112

| | |
|---|---|
| DYN SIGNAL STRENGTH TH. | -65 dBm |
| CHANNEL UTILIZATION TH. | 50% |
| BACKHAUL UTILIZATION TH. | 50% |
| NUMBER OF DEVICES TH. | 20 |

5120

5122

| | SIGNAL STRENGTH | CHANNEL UTILIZATION | BACKHAUL UTILIZATION | NUMBER OF DEVICES | ADMISSION DECISION | ENTITY EXPERIENCE |
|---|---|---|---|---|---|---|
| ENTITY 1 | -64 dBm | 40% | 40% | 10 | ADMIT | GOOD |
| ENTITY 2 | -74 dBm | n/a | n/a | n/a | REJECT | n/a |
| ENTITY 3 | -60 dBm | 60% | 40% | 10 | REJECT | n/a |
| ENTITY 4 | -60 dBm | 40% | 60% | 10 | REJECT | n/a |
| ENTITY 5 | -60 dBm | 40% | 40% | 50 | REJECT | n/a |

FIG. 5A

THRESHOLD VALUES 5212

| | |
|---|---|
| STATIC RSSI TH. VALUE | -75 dBm |
| CHANNEL UTILIZATION TH. | 50% |
| BACKHAUL UTILIZATION TH. | 50% |
| NUMBER OF DEVICES TH. | 20 |

5210

5222

| | SIGNAL STRENGTH | CHANNEL UTILIZATION | BACKHAUL UTILIZATION | NUMBER OF DEVICES | ADMISSION DECISION | ENTITY EXPERIENCE |
|---|---|---|---|---|---|---|
| ENTITY 6 | -74 dBm | 40% | 40% | 10 | ADMIT | POOR |

FIG 5B

ADMITTING AN ENTITY COMPUTING DEVICE TO A NETWORK BASED ON A SIGNAL STRENGTH AND NETWORK CONDITIONS

BACKGROUND

Network computing devices (e.g., an access point) may admit entity computing devices (e.g., user equipment) to a network when a signal strength associated with the entity computing device is sufficiently strong.

SUMMARY

The disclosure relates generally to techniques implemented by a network computing device for admitting an entity computing device to a network. For example, the network computing device can implement various techniques which consider factors beyond the signal strength associated with the entity computing device, before admitting the entity computing device to the network.

According to an example of the disclosure a method for admitting an entity computing device to a network includes receiving, by a network computing device, a request from an entity computing device for admission to a network; determining, by the network computing device, whether a signal strength associated with the entity computing device satisfies a signal strength threshold value; in response to determining the signal strength associated with the entity computing device satisfies the signal strength threshold value, determining, by the network computing device, whether one or more network conditions associated with the network are satisfied; and in response to determining the one or more network conditions associated with the network are satisfied, admitting, by the network computing device, the entity computing device to the network.

In some implementations, the one or more network conditions associated with the network include one or more of a channel utilization condition, a number of computing devices connected to the network condition, and a backhaul utilization condition.

In some implementations, determining, by the network computing device, whether the one or more network conditions associated with the network are satisfied comprises: determining whether a channel utilization associated with the network is less than a channel utilization threshold value; determining whether a backhaul utilization associated with the network is less than a backhaul utilization threshold value; and determining whether a number of computing devices connected to the network is less than a device count threshold value.

In some implementations, determining, by the network computing device, whether the signal strength associated with the entity computing device satisfies the signal strength threshold value comprises: determining whether a received signal strength indicator (RSSI) associated with the entity computing device is less than a reference RSSI threshold value.

In some implementations, the method includes dynamically adjusting the signal strength threshold value based on a current noise floor level associated with the network.

In some implementations, dynamically adjusting the signal strength threshold value based on the current noise floor level associated with the network comprises: determining the current noise floor level associated with the network; determining a first candidate signal strength threshold value based on a difference between a signal-to-noise ratio (SNR)

value and the current noise floor level; determining a second candidate signal strength threshold value based on a configured received signal strength indicator (RSSI); and setting the signal strength threshold value to a lowest absolute value between the first candidate signal strength threshold value and the second candidate signal strength threshold value.

In some implementations, the SNR value is a configured SNR value.

In some implementations, the SNR value is a highest value between a SNR value associated with the entity computing device and a SNR value associated with the network computing device.

In some implementations, the method includes in response to determining the signal strength associated with the entity computing device satisfies the signal strength threshold value, determining, by the network computing device, whether one or more network conditions associated with a further network are satisfied; in response to determining the one or more network conditions associated with the network are satisfied and the one or more network conditions associated with the further network are satisfied, ranking each of the network and the further network, by the network computing device, based on the one or more network conditions associated with the network and the one or more network conditions associated with the further network; and admitting, by the network computing device, the entity computing device to the network when the network is higher ranked than the further network.

According to an example of the disclosure, a network computing device for admitting an entity computing device to a network is provided. The network computing device includes: at least one memory configured to store instructions; and at least one processor configured to execute the instructions stored in the at least one memory to: receive a request from an entity computing device for admission to a network; determine whether a signal strength associated with the entity computing device satisfies a signal strength threshold value; in response to determining the signal strength associated with the entity computing device satisfies the signal strength threshold value, determine whether one or more network conditions are satisfied; and in response to determining the one or more network conditions are satisfied, admit the entity computing device to the network.

In some implementations, the one or more network conditions associated with the network include one or more of a channel utilization condition, a number of computing devices connected to the network condition, and a backhaul utilization condition.

In some implementations, to determine whether the one or more network conditions associated with the network are satisfied, the at least one processor is configured to: determine whether a channel utilization associated with the network is less than a channel utilization threshold value; determine whether a backhaul utilization associated with the network is less than a backhaul utilization threshold value; and determine whether a number of computing devices connected to the network is less than a device count threshold value.

In some implementations, to determine whether the signal strength associated with the entity computing device satisfies the signal strength threshold value, the at least one processor is configured to: determine whether a received signal strength indicator (RSSI) associated with the entity computing device is less than a reference RSSI threshold value.

In some implementations, the at least one processor is configured to dynamically adjust the signal strength threshold value based on a current noise floor level associated with the network.

In some implementations, to dynamically adjust the signal strength threshold value based on the current noise floor level associated with the network, the at least one processor is configured to: determine the current noise floor level associated with the network; determine a first candidate signal strength threshold value based on a difference between a signal-to-noise ratio (SNR) value and the current noise floor level; determine a second candidate signal strength threshold value based on a configured received signal strength indicator (RSSI); and set the signal strength threshold value to a lowest absolute value between the first candidate signal strength threshold value and the second candidate signal strength threshold value.

In some implementations, the SNR value is a configured SNR value.

In some implementations, the SNR value is a highest value between a SNR value associated with the entity computing device and a SNR value associated with the network computing device.

In some implementations, the at least one processor is configured to: in response to determining the signal strength associated with the entity computing device satisfies the signal strength threshold value, determine whether one or more network conditions associated with a further network are satisfied; in response to determining the one or more network conditions associated with the network are satisfied and the one or more network conditions associated with the further network are satisfied, rank each of the network and the further network based on the one or more network conditions associated with the network and the one or more network conditions associated with the further network; and admit the entity computing device to the network when the network is higher ranked than the further network.

According to an example of the disclosure, a non-transitory computer-readable storage medium includes executable instructions configured to cause one or more processor devices of a network computing device to: receive a request from an entity computing device for admission to a network; determine whether a signal strength associated with the entity computing device satisfies a signal strength threshold value; in response to determining the signal strength associated with the entity computing device satisfies the signal strength threshold value, determine whether one or more network conditions are satisfied; and in response to determining the one or more network conditions are satisfied, admit the entity computing device to the network.

In some implementations, the executable instructions are further configured to cause one or more processor devices of a network computing device to dynamically adjust the signal strength threshold value based on a current noise floor level associated with the network.

In some implementations, the non-transitory computer-readable storage medium includes executable instructions configured to cause one or more processor devices of the server computing system to implement any of the operations of the methods disclosed herein.

Individuals will appreciate the scope of the disclosure and realize additional aspects thereof after reading the following detailed description of the examples in association with the accompanying drawings.

BRIEF DESCRIPTION OF THE DRAWINGS

The accompanying drawing figures incorporated in and forming a part of this specification illustrate several aspects of the disclosure and, together with the description, serve to explain the principles of the disclosure.

FIG. 3 illustrates an example computer implemented method for determining a dynamic signal strength threshold value, according to example embodiments of the disclosure.

FIGS. 5A-5B are example illustrations including tables which depict example admission decisions of a network computing device, according to example embodiments of the disclosure.

DETAILED DESCRIPTION

Figure 1:
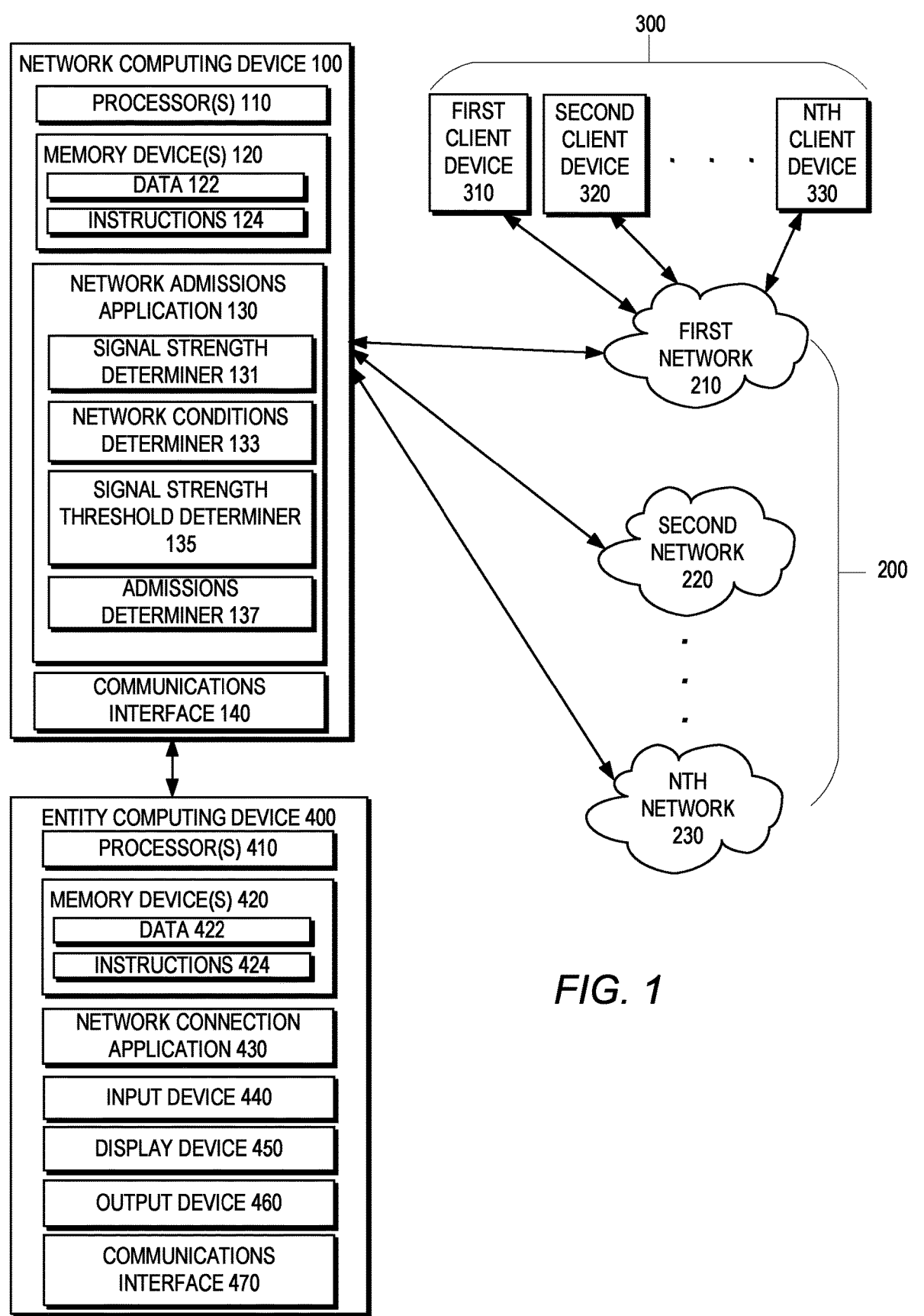
FIG. 1 is an example block diagram of an environment suitable for connecting an entity computing device to a network via a network computing device, according to example embodiments of the disclosure.

The examples set forth below represent the information to enable individuals to practice the examples and illustrate the best mode of practicing the examples. Upon reading the following description in light of the accompanying drawings, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of operations. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context.

The term "and/or" includes a combination of a plurality of related listed items or any item of the plurality of related listed items. For example, the scope of the expression or phrase "A and/or B" includes the item "A", the item "B", and the combination of items "A and B".

In addition, the scope of the expression or phrase "at least one of A or B" is intended to include all of the following: (1) at least one of A, (2) at least one of B, and (3) at least one of A and at least one of B. Likewise, the scope of the expression or phrase "at least one of A, B, or C" is intended to include all of the following: (1) at least one of A, (2) at least one of B, (3) at least one of C, (4) at least one of A and at least one of B, (5) at least one of A and at least one of C, (6) at least one of B and at least one of C, and (7) at least one of A, at least one of B, and at least one of C.

Current Wi-Fi® ecosystems admit entity computing devices (e.g., user equipment) to a network based on a received signal strength indicator (RSSI) value associated with the entity computing device that is detected (e.g., during a probe). However, determining whether to admit an entity computing device to a network solely based on the RSSI value may not be an optimal solution, as the entity computing device may still suffer from a poor network experience due to environmental conditions (e.g., noise) that is not completely accounted for based on a RSSI value, or due to network conditions that are not known by the entity computing device.

According to examples of the disclosure described herein, various techniques may be implemented by a network computing device (e.g., an access point) that considers factors beyond the RSSI value, before admitting the entity computing device to the network, so that the entity computing device is more likely to have an efficient and reliable network experience if admitted to the network.

Example aspects of the disclosure provide several technical effects, benefits, and/or improvements in computing technology and the technology of network computing devices and telecommunications. For example, according to one or more examples of the disclosure, a network experience of an entity computing device can be improved by admitting the entity computing device to the network if a plurality of conditions is satisfied (e.g., a threshold signal strength value is satisfied and one or more network conditions are satisfied). For example, a network computing device may not admit an entity computing device to a network when the network channel utilization is excessively high, thereby saving or conserving network resources and avoiding a poor network experience of the entity computing device.

For example, according to one or more examples of the disclosure, a network experience of an entity computing device can be improved by dynamically adjusting a signal strength threshold value according to real-time or current noise levels existing in the network environment, so that the entity computing device may not be connected to a network which is heavily affected by noise.

As described herein, the selective admissions decisions by the network computing device can conserve or save network resources by preventing poor network experiences of the entity computing device which would otherwise have to disconnect from the network and find another network to connect to.

In some implementations, the network computing device may further be configured to identify an optimal network among a plurality of networks that the entity computing device can connect to, by comparing network conditions among a plurality of networks and ranking the networks. Therefore, the entity computing device can be connected to an optimal network.

Reference will now be made to examples of the disclosure, one or more examples of which are illustrated in the drawings, wherein like reference characters denote like elements. Each example is provided by way of explanation of the disclosure and is not intended to limit the disclosure.

FIG. 1 is an example block diagram of an environment suitable for connecting an entity computing device to a network via a network computing device, according to some implementations of the disclosure. In FIG. 1, the environment includes a network computing device 100, a plurality of client devices 300, and an entity computing device 400, which are connectable to one another, for example, over one or more of the plurality of networks 200.

The network computing device 100 can include an access point or a router which serves as a hub to link (connect) an entity computing device (e.g., entity computing device 400) to one or more wireless networks (e.g., first network 210, second network 220, etc.). The network computing device 100 can extend the communication range of an entity computing device and enable various wireless devices to access network resources from one or more of the plurality of networks 200.

The plurality of client devices 300 may include other entity computing devices which are already connected to one of the plurality of networks 200. Each of the client devices among the plurality of client devices 300 may have a similar general configuration or may have a different configuration from each other. For example, operating systems of the client devices may be different from one another. The plurality of client devices 300 may correspond to a server, a compute node, user equipment (UE), a host computer, and any other computing device suitable for operating in a network environment.

The entity computing device 400 can include any of a personal or desktop computer, a smartphone, a laptop, a tablet computer, user equipment (UE), and the like. For example, in some implementations the network computing device 100 includes a network admissions application 130 which is configured to determine whether or not to admit the entity computing device 400 to one of the plurality of networks 200. Detailed operations of the network admissions application 130 are described herein.

For example, the network 200 may include any type of wireless (e.g., cellular) communications network such as a local area network (LAN), wireless local area network (WLAN), wide area network (WAN), personal area network (PAN), virtual private network (VPN), or the like. For example, wireless communication between elements of the examples described herein may be performed via a wireless LAN, Wi-Fi®, Bluetooth, ZigBee, Wi-Fi® direct (WFD), ultra wideband (UWB), infrared data association (IrDA), Bluetooth low energy (BLE), near field communication (NFC), a radio frequency (RF) signal, and the like.

In some implementations, the entity computing device 400 may be connected to the network computing device 100 in a wired or wireless manner. For example, wired communication between elements of the examples described herein may be performed via a pair cable, a coaxial cable, an optical fiber cable, an Ethernet cable, and the like. Communication over the networks described herein can use a wide variety of communication protocols (e.g., TCP/IP, HTTP, SMTP, FTP), encodings or formats (e.g., HTML, XML), and/or protection schemes (e.g., VPN, secure HTTP, SSL).

The network computing device 100 may include one or more processors 110, one or more memory devices 120, the network admissions application 130, and a communications interface 140. Each of the features of the network computing device 100 may be operatively connected with one another via a system bus. For example, the system bus may be any of several types of bus structures that may further interconnect to a memory bus (with or without a memory controller), a peripheral bus, and/or a local bus using any of a variety of commercially available bus architectures.

The plurality of client devices 300 (e.g., including first client device 310, second client device 320, . . . Nth client device 330) may include various features, including features similar to the entity computing device 400 (e.g., one or more processors, one or more memory devices, a network connection application, an input device, a display device, an output device, a communications interface, etc.). Therefore, features of the plurality of client devices 300 will not be repeated or described for the sake of brevity. As already described herein, the plurality of client devices 300 may correspond to a server, a compute node, a host computer, and any other computing device suitable for operating in a network environment (e.g., a wireless network environment).

The entity computing device 400 may include one or more processors 410, one or more memory devices 420, a network connection application 430, an input device 440, a display device 450, an output device 460, and a communications interface 470. Each of the features of the entity computing device 400 may be operatively connected with one another via a system bus. For example, the system bus may be any of several types of bus structures that may further interconnect to a memory bus (with or without a memory controller), a peripheral bus, and/or a local bus using any of a variety of commercially available bus architectures.

For example, the one or more processors 110, 410 can be any suitable processing device that can be included in a network computing device 100 or entity computing device 400. For example, such a processor 110, 410 may include one or more of a processor, processor cores, a controller and an arithmetic logic unit, a central processing unit (CPU), a graphics processing unit (GPU), a digital signal processor (DSP), an image processor, a microcomputer, a field programmable array, a programmable logic unit, an application-specific integrated circuit (ASIC), a microprocessor, a microcontroller, etc., and combinations thereof, including any other device capable of responding to and executing instructions in a defined manner. The one or more processors 110, 410 can be a single processor or a plurality of processors that are operatively connected, for example in parallel.

The one or more memory devices 120, 420 can include one or more non-transitory computer-readable storage mediums, such as such as a Read Only Memory (ROM), Programmable Read Only Memory (PROM), Erasable Programmable Read Only Memory (EPROM), and flash memory, a USB drive, a volatile memory device such as a Random Access Memory (RAM), an internal or external hard disk drive (HDD), floppy disks, a blue-ray disk, or optical media such as CD ROM discs and DVDs, and combinations thereof. However, examples of the one or more memory devices 120, 420 are not limited to the above description, and the one or more memory devices 120, 420 may be realized by other various devices and structures as would be understood by those skilled in the art.

For example, the one or more memory devices 120 can store instructions, that when executed, cause the one or more processors 110 to (e.g., via the network admissions application 130): receive a request from the entity computing device 400 for admission to a network (e.g., one of the plurality of networks 200); determine whether a signal strength associated with the entity computing device 400 satisfies a signal strength threshold value; in response to determining the signal strength associated with the entity computing device 400 satisfies the signal strength threshold value, determine whether one or more network conditions are satisfied; and in response to determining the one or more network conditions are satisfied, admit the entity computing device 400 to the network (e.g., one of the plurality of networks 200), as described according to examples of the disclosure.

For example, the one or more memory devices 420 can store instructions, that when executed, cause the one or more processors 410 to (e.g., via the network connection application 430 and input device 440) transmit an input requesting admission (e.g., a connection request) to a network (e.g., one of the plurality of networks 200), as described according to examples of the disclosure.

The one or more memory devices 120 can also include data 122 and instructions 124 that can be retrieved, manipulated, created, or stored by the one or more processors 110. In some examples, such data can be accessed and used as input to (e.g., via the network admissions application 130): receive a request from the entity computing device 400 for admission to a network (e.g., one of the plurality of networks 200); determine whether a signal strength associated with the entity computing device 400 satisfies a signal strength threshold value; in response to determining the signal strength associated with the entity computing device 400 satisfies the signal strength threshold value, determine whether one or more network conditions are satisfied; and in response to determining the one or more network conditions are satisfied, admit the entity computing device 400 to the network (e.g., one of the plurality of networks 200), as described according to examples of the disclosure.

The one or more memory devices 420 can also include data 422 and instructions 424 that can be retrieved, manipulated, created, or stored by the one or more processors 410. In some examples, such data can be accessed and used as input to (e.g., via the network connection application 430 and input device 440) transmit an input requesting admission (e.g., a connection request) to a network (e.g., one of the plurality of networks 200), as described according to examples of the disclosure.

The network admissions application 130 can include any application suitable for determining whether to admit computing devices (e.g., entity computing devices including user equipment) to a wireless (e.g., cellular) network via the network computing device 100. As shown in FIG. 1, the network admissions application 130 can include the signal strength determiner 131, network conditions determiner 133, signal strength threshold determiner 135, and admissions determiner 137. However, fewer or more of these features can be included as part of network admissions application 130, and the described features are merely example features of an example network admissions application 130.

The signal strength determiner 131 can be configured to determine a signal strength associated with the entity computing device 400. In some implementations, signal strength determiner 131 may be configured to measure or calculate a Received Signal Strength Indicator (RSSI) value as the signal strength. For example, the RSSI value may be used to measure the relative quality of a received signal and can be represented on various scales (e.g., a scale of 0 to up to 255, a 0-100 scale, a 0-60 scale, etc.). In some implementations the RSSI value may be measured in terms of decibels (dBm), where the closer the value is to 0 dBm, the better the strength of the signal. In some implementations, signal strength determiner 131 may be configured to determine the RSSI value based on a difference between a signal transmission power and losses (e.g., path loss) which occur during propagation of the signal.

The signal strength determiner 131 may obtain an uplink RSSI (UL RSSI) value which indicates a power level as received by the network computing device 100 with respect to the communication path from the entity computing device 400 to the network computing device 100 and/or a downlink RSSI (DL RSSI) value which indicates a power level as received by the entity computing device 400 with respect to the communication path from the network computing device

100 to the entity computing device 400. The UL RSSI value and/or the DL RSSI value may be referenced by the network computing device 100 (e.g., admissions determiner 137) for determining whether to admit the entity computing device 400 to the network.

In some implementations, signal strength determiner 131 may be configured to measure or calculate a signal-to-noise ratio (SNR) as the signal strength. For example, the SNR value corresponds to a measure of the ratio between the received signal power and the background noise power. Generally, SNR is expressed in decibels and a higher SNR value means a higher signal strength.

The signal strength determiner 131 may obtain a first SNR value which indicates a strength of a received signal relative to the background noise level at the network computing device 100 with respect to the communication path from the entity computing device 400 to the network computing device 100 and/or a second SNR value which indicates a strength of a received signal relative to the background noise level at the entity computing device 400 with respect to the communication path from the network computing device 100 to the entity computing device 400. The first SNR value and/or the second SNR value may be referenced by the network computing device 100 (e.g., admissions determiner 137) for determining whether to admit the entity computing device 400 to the network.

In some implementations, the signal strength threshold value can vary dynamically. For example, signal strength threshold determiner 135 may be configured to dynamically adjust the signal strength threshold value based on a current noise floor level associated with a network. For example, signal strength threshold determiner 135 may be configured to: determine a current (e.g., real-time) noise level associated with a network (e.g., one of the plurality of networks 200), determine a first candidate signal strength threshold value based on a difference between a signal-to-noise ratio (SNR) value and the current noise floor level, determine a second candidate signal strength threshold value based on a configured received signal strength indicator (RSSI), and set the signal strength threshold value to a lowest absolute value between the first candidate signal strength threshold value and the second candidate signal strength threshold value.

For example, the first candidate signal strength threshold value may be referred to as a derived threshold value and be calculated according to a difference between the current noise floor value (in dBm) and the SNR value (in dB). The noise floor may refer to a noise level that can cause signal interference which may be caused by non Wi-Fi® sources including radar, microwaves, refrigerators, TVs, building materials, large bodies of water, etc. Generally, the noise floor is measured in decibels (dB) and may range from 0 dB to −120 dB with values of −90 dB and lower being acceptable for wireless transmissions and values greater than −90 dB causing data corruption and performance degradation.

For example, if the noise floor value is −80 dBm and the SNR value is 15 dB, the derived threshold value may be −65 dBm. In some implementations, the SNR value may be a reference or administratively configured SNR value (e.g., 15 dB, 20 dB, 25 dB, etc.). In some implementations, the SNR value may be the highest value between a current or real-time SNR value associated with the entity computing device 400 (e.g., the second SNR value) and a current or real-time SNR value associated with the network computing device 100 (e.g., the first SNR value).

For example, the second candidate signal strength threshold value may be referred to as a configured RSSI threshold value. For example, the configured RSSI threshold value may be a reference or administratively configured static RSSI value (e.g., −80 dBm, −70 dBm, −67 dBm, etc.).

As mentioned above, the signal strength threshold determiner 135 may be configured to set the signal strength threshold value to the lowest absolute value between the first candidate signal strength threshold value and the second candidate signal strength threshold value. If the derived threshold value is −80 dBm (−95 dB noise floor and 15 dB SNR) and the second candidate signal strength threshold value is −75 dBm, then the signal strength threshold determiner 135 may be configured to set the signal strength threshold value to −75 dBm, which is the lowest absolute value between the first candidate signal strength threshold value and the second candidate signal strength threshold value. If the derived threshold value is −65 dBm (−80 dB noise floor and 15 dB SNR) and the second candidate signal strength threshold value is −75 dBm, then the signal strength threshold determiner 135 may be configured to set the signal strength threshold value to −65 dBm, which is the lowest absolute value between the first candidate signal strength threshold value and the second candidate signal strength threshold value. If the signal strength threshold value is simply set to a static RSSI value such as −75 dBm, a user experience may suffer when the network computing device 100 is affected by noise (such as in the case of a noise floor having a value of −80 dB) which may not be adequately reflected in the measured RSSI value of the network computing device 100. By dynamically varying the signal strength threshold value according to a current floor noise level, a signal strength threshold value can be enhanced to better ensure that the user experience does not suffer when the entity computing device 400 is connected to a wireless network via the network computing device 100.

For example, the admissions determiner 137 may be configured to determine whether a signal strength associated with the entity computing device 400 satisfies a signal strength threshold value. For example, the signal strength threshold value may be configured or set as a value which provides for some minimal signal strength for reliable data packet delivery or set based on timeliness requirements (e.g., for streaming video performance). For example, when the signal strength threshold value corresponds to an RSSI value, the signal strength threshold value may be set to −80 dBm, −70 dBm, −67 dBm, etc. For example, when the signal strength threshold value corresponds to an SNR value, the signal strength threshold value may be set to 15 dB, 20 dB, 25 dB, etc. In some implementations, the signal strength threshold value may be dynamically set as described herein to the lowest absolute value between the first candidate signal strength threshold value (derived threshold value) and the second candidate signal strength threshold value (configured RSSI threshold value).

According to examples of the disclosure, the admissions determiner 137 may be configured to, in response to determining the signal strength associated with the entity computing device 400 does not satisfy the signal strength threshold value, determine to not admit the entity computing device 400 to the requested network. According to examples of the disclosure, the admissions determiner 137 may be configured to, in response to determining the signal strength associated with the entity computing device 400 satisfies the signal strength threshold value, determine whether one or more network conditions associated with the network are satisfied.

For example, the one or more network conditions associated with the network may include one or more of a channel utilization condition, a number of computing devices connected to the network condition, and a backhaul utilization condition. The network conditions determiner 133 may be configured to determine the one or more network conditions.

For example, network conditions determiner 133 may be configured to determine the channel utilization condition for a network among the plurality of networks 200 by monitoring the activity and traffic on a wireless channel it is operating on. Channel utilization provides information about how busy or congested the channel is and can be used by the network computing device 100 to make decisions regarding channel allocation and optimization. For example, the network conditions determiner 133 may be configured to perform active channel scanning by temporarily switching to different channels and measuring the level of activity or traffic present on each channel. The channel utilization value (condition) indicates the amount of time that the network computing device 100 considers the channel to be busy. The channel utilization condition (value) may be expressed as a percentage value, with percentages lower than a threshold level (e.g., lower than 30%, lower than 50%, lower than 70%, etc.) being indicative of efficient and reliable communication.

For example, network conditions determiner 133 may be configured to determine the backhaul utilization condition for a network among the plurality of networks 200. The backhaul connection refers to network connections that link the network computing device 100 to a core network or Internet (e.g., in a wired and/or wireless manner). For example, the backhaul connection can include wired connections between the network computing device 100 and core network such as Ethernet, fiber-optic cables, or dedicated leased lines. Wireless connections can include point-to-point microwave links or satellite connections that can also be utilized for backhaul. The backhaul utilization condition (value) may be expressed in terms of an available capacity (e.g., the amount or volume of data) of the backhaul connection (e.g., 35 megabits per second, 100 megabits per second, 150 megabits per second, 2 gigabytes per second, etc.) or a percentage of the maximum capacity (e.g., 30%, 50% utilization, 70% utilization, etc.). In some implementations, the backhaul utilization condition (value) may be varied depending on the number of clients on the network. For example, as more clients are connected to the network, the threshold throughput rate may be raised so that an average throughput rate per client is maintained above a threshold level (e.g., an average throughput rate threshold level of 25 megabits per second could support four clients simultaneously when the maximum throughput rate is 100 megabits per second).

For example, network conditions determiner 133 may be configured to determine the number of client devices 300 which are connected to a network among the plurality of networks 200 and/or a number of client devices 300 which are connected to the network computing device 100. In some implementations, a threshold level (e.g., the number of computing devices connected to the network condition) may be configurable and may depend on characteristics of the network computing device 100 (e.g., the number of antennas associated with the network computing device 100) as well as a desired throughput rate based on the backhaul utilization condition. For example, the number of client devices 300 may be limited to a threshold value (e.g., 30, 100, 300, etc.).

As described herein, the admissions determiner 137 may be configured to, in response to determining the signal strength associated with the entity computing device 400 satisfies the signal strength threshold value, determine whether one or more network conditions associated with the network are satisfied. For example, the admissions determiner 137 may be configured to determine whether the channel utilization condition is satisfied based on whether the measured channel utilization percentage is less than a channel utilization threshold value (e.g., lower than 30%, lower than 50%, lower than 70%, etc.).

In some implementations, the admissions determiner 137 may be configured to admit the entity computing device 400 to the network if the channel utilization condition is satisfied and to not admit the entity computing device 400 to the network if the channel utilization condition is not satisfied. In some implementations, the admissions determiner 137 may be configured to determine whether yet another network condition is satisfied before admitting the entity computing device 400 to the network.

For example, the admissions determiner 137 may be configured to, in response to determining the channel utilization condition satisfies the channel utilization threshold value, determine whether one or more other network conditions associated with the network are satisfied. For example, the admissions determiner 137 may be configured to determine whether the backhaul utilization condition is satisfied based on whether a percentage of the maximum is less than a backhaul utilization threshold value (e.g., lower than 50%, lower than 70%, etc.). In other implementations, the admissions determiner 137 may be configured to determine whether the backhaul utilization condition is satisfied based on whether a throughput rate of the backhaul connection is greater than a backhaul throughput threshold value (e.g., more than 35 megabits per second, 100 megabits per second, 150 megabits per second, 2 gigabytes per second, etc.).

In some implementations, the admissions determiner 137 may be configured to admit the entity computing device 400 to the network if the backhaul utilization condition is satisfied and to not admit the entity computing device 400 to the network if the backhaul utilization condition is not satisfied. In some implementations, the admissions determiner 137 may be configured to determine whether yet another network condition is satisfied before admitting the entity computing device 400 to the network.

For example, the admissions determiner 137 may be configured to, in response to determining the backhaul utilization condition satisfies the backhaul utilization threshold value, determine whether one or more other network conditions associated with the network are satisfied. For example, the admissions determiner 137 may be configured to determine whether the number of computing devices connected to the network condition is satisfied based on whether a number of computing devices connected to the network is less than a device count threshold value (e.g., 30 computing devices, 100 computing devices, 300 computing devices, etc.).

In some implementations, the admissions determiner 137 may be configured to admit the entity computing device 400 to the network if the number of computing devices connected to the network condition is satisfied and to not admit the entity computing device 400 to the network if the number of computing devices connected to the network condition is not satisfied. In some implementations, the admissions determiner 137 may be configured to determine whether one or more other network conditions are satisfied before admitting the entity computing device 400 to the network.

As described herein, the admissions determiner 137 may first determine whether the channel utilization threshold value is satisfied before determining whether other network conditions are satisfied. However, in some implementations the admissions determiner 137 may first determine whether another network condition is satisfied (e.g., the backhaul utilization threshold value) before determining whether the channel utilization threshold value is satisfied.

Likewise, as described herein in some implementations the admissions determiner 137 may first determine whether the backhaul utilization threshold value is satisfied before determining whether other network conditions are satisfied. However, in some implementations the admissions determiner 137 may first determine whether another network condition is satisfied (e.g., the device count threshold value) before determining whether the backhaul utilization threshold value is satisfied.

According to examples of the disclosure, the admissions determiner 137 may also be configured to determine a network among the plurality of networks 200 which is optimal for the entity computing device 400 to connect to, provided that entity computing device 400 can potentially be admitted to at least two of the networks among the plurality of networks 200 based on the network conditions associated with each of those networks. For example, the admissions determiner 137 may be configured to rank networks among the plurality of networks 200 to determine a network which has the most favorable network conditions.

For example, the network admissions application 130 may be configured to scan channels corresponding to each of the networks among the plurality of networks 200 and determine a traffic profile for each of the networks which includes respective network conditions associated with the network including a channel utilization condition, a number of computing devices connected to the network condition, a backhaul utilization condition, and the like. The network admissions application 130 may be configured to rank each network based on each of the respective network conditions to determine a network among the plurality of networks having the most favorable network conditions. The network admissions application 130 may be configured to weigh some network conditions more heavily than other network conditions. For example, a channel utilization condition may be weighted more heavily than a backhaul utilization condition and a backhaul utilization condition may be weighted more heavily than a number of computing devices connected to the network condition.

Thus, in response to determining the signal strength associated with the entity computing device satisfies the signal strength threshold value, the network conditions determiner 133 may be configured to determine whether one or more network conditions associated with each of a plurality of networks (e.g., first network 210, second network 220, . . . Nth network 230) are satisfied. In response to determining the one or more network conditions associated with at least two of the networks are satisfied, the admissions determiner 137 may be configured to compare the one or more network conditions associated with each of the at least two of the networks to determine which of the at least two networks have the most favorable network conditions (e.g., which of the networks is most highly ranked). In some implementations, the admissions determiner 137 may be configured to automatically admit the entity computing device 400 to the network having the most favorable network conditions. In other implementations, the entity computing device 400 may request to connect to a first network (e.g., first network 210), but the network computing device 100 determines a further network (e.g., second network 220) has more favorable network conditions. In such a case, the network computing device 100 may be configured to transmit a query or prompt to the entity computing device 400 offering the further network as an alternative (better) network for the entity computing device 400 to connect to, even though the first network may also satisfy the one or more network conditions.

Each of the network computing device 100 and entity computing device 400 may include a communications interface. For example, communications interfaces 140, 470 may include any communications interfaces suitable for communicating via the network 200 as appropriate or desired. For example, the communications interfaces 140, 470 may include a network interface card.

Referring back to the entity computing device 400, further features of the network connection application 430, input device 440, display device 450, and output device 460 will now be described.

Figure 4:
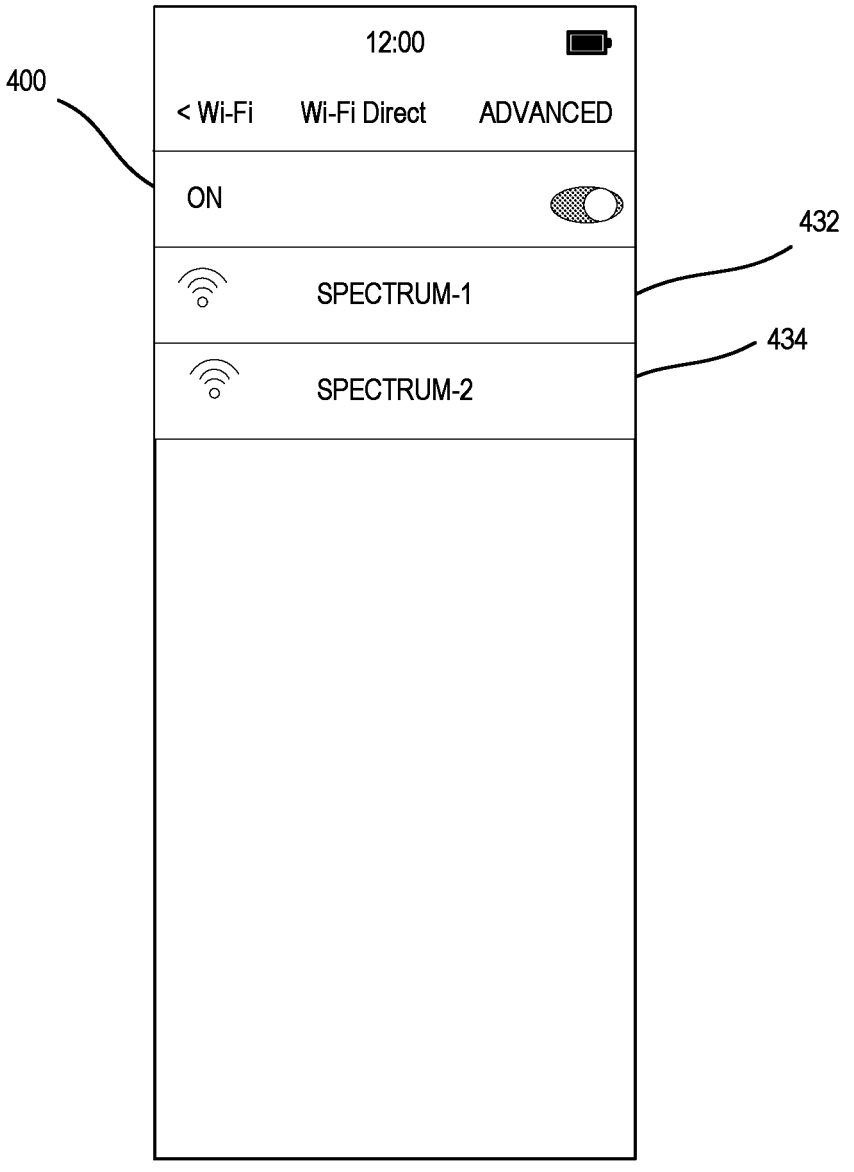
FIG. 4 depicts an example user interface screen which can be presented for display on an entity computing device, according to example embodiments of the disclosure.

The entity computing device 400 includes a network connection application 430. The network connection application 430 can include any application which allows or is capable of allowing the entity computing device 400 to connect to a network. For example, FIG. 4 depicts an example user interface screen which can be presented for display on the display device 450 of the entity computing device 400 via the network connection application 430. In FIG. 4, various wireless networks to which the entity computing device 400 can be connected to may be presented for selection. FIG. 4 illustrates a first network 432 and a second network 434 which the entity computing device 400 can connect to (e.g., via the network computing device 100). In response to a user selecting the first network 432 (e.g., via a touch input to the display device 450), the entity computing device 400 may transmit a request to connect to the first network 432 to the network computing device 100. The network computing device 100 may determine whether to admit the entity computing device 400 to the first network 432 according to the methods described herein, for example, as described with respect to the network admissions application 130 and the methods described with respect to FIGS. 2 and 3.

The entity computing device 400 includes an input device 440 configured to receive an input from a user and may include, for example, one or more of a keyboard (e.g., a physical keyboard, virtual keyboard, etc.), a mouse, a joystick, a button, a switch, an electronic pen or stylus, a gesture recognition sensor (e.g., to recognize gestures of a user including movements of a body part), an input sound device or voice recognition sensor (e.g., a microphone to receive a voice command), a track ball, a remote controller, a portable (e.g., a cellular or smart) phone, and so on. The input device 440 may be integrated with the entity computing device 400 or may be communicatively coupled to the entity computing device 400. For example, a user may hold a remote controller having buttons, switches, a keyboard, etc., to provide an input for executing a function of the entity computing device 400, where the input may be transmitted from the remote controller to the entity computing device 400 in a wired or wireless manner. The input device 440 may also be embodied by a touch-sensitive display device having a touchscreen capability, for example. The input device 440 may be used by a user of the entity computing device 400 to provide an input to request a connection to a wireless network as described herein. For example, the input may be a voice input, a touch input, a gesture input, a click via a mouse or remote controller, and so on.

The entity computing device 400 may include a display device 450 which presents information viewable by the user, for example on a user interface (e.g., the user interface as shown in FIG. 4). For example, the display device 450 may be a non-touch sensitive display or a touch sensitive display. The display device 450 may include a liquid crystal display (LCD), a light emitting diode (LED) display, an organic light emitting diode (OLED) display, active matrix organic light emitting diode (AMOLED), flexible display, 3D display, a plasma display panel (PDP), a cathode ray tube (CRT) display, and the like, for example. However, the disclosure is not limited to these example display devices and may include other types of display devices.

The entity computing device 400 may include an output device 460 configured to provide an output to the user and may include, for example, one or more of an audio device (e.g., one or more speakers), a haptic device to provide haptic feedback to a user, a light source (e.g., one or more light sources such as LEDs which provide visual feedback to a user), and the like. For example, in some implementations, the user may be guided through a process for connecting to a network using the network connection application 430. The output device 460 may provide various indications to inform, alert, or notify the user of options for connecting to one or more wireless networks. For example, in some implementations, the user may be notified or alerted to perform a certain action such as to prompt the user to select a network among a plurality of networks, via a combination of one or more of a speaker, haptic device, and light source.

Figure 2:
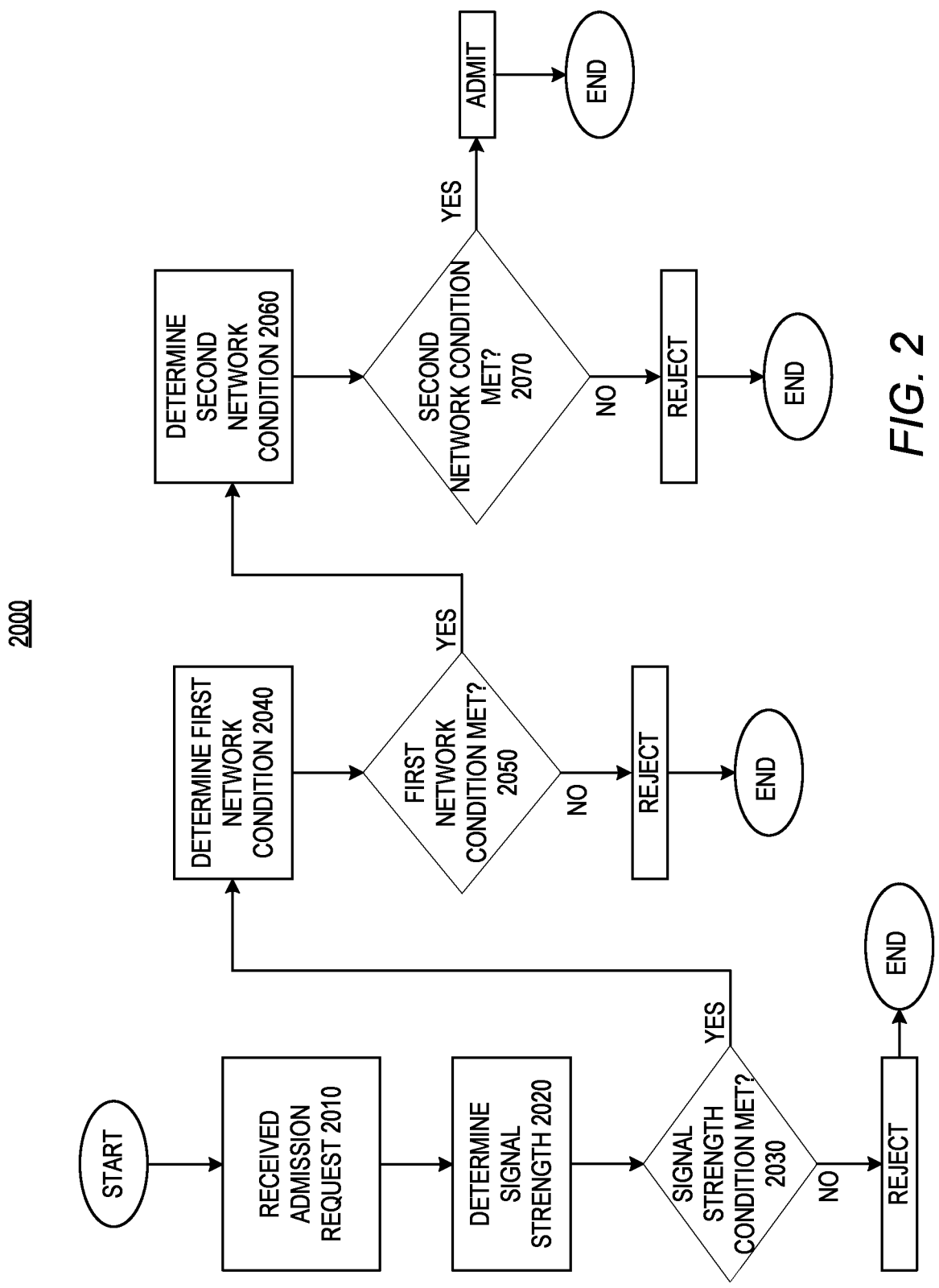
FIG. 2 illustrates an example computer implemented method for connecting an entity computing device to a network via a network computing device, according to example embodiments of the disclosure.

FIG. 2 illustrates an example computer implemented method for connecting an entity computing device to a network via a network computing device, according to example embodiments of the disclosure. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Referring to FIG. 2, in the example computer implemented method 2000 at operation 2010 the method 2000 includes the network computing device 100 receiving a request from an entity computing device 400 for admission to a network. For example, the request may be received via the communications interface 140.

At operation 2020 the method includes determining, by the network computing device 100, a signal strength. For example, the signal strength determiner 131 may determine a signal strength associated with the entity computing device 400 and/or a signal strength associated with the network computing device 100. For example, the signal strength may be represented by an RSSI value, a SNR value, combinations thereof, etc.

At operation 2030 the method includes determining, by the network computing device 100, whether a signal strength associated with the entity computing device 400 satisfies a signal strength threshold value.

In some implementations, the network computing device 100 may determine whether an entity-side RSSI value associated with the entity computing device 400 satisfies a static threshold RSSI value (e.g., more than −75 dBm) and/or determine whether a network computing device-side RSSI value associated with the network computing device 100 satisfies the static threshold RSSI value (e.g., more than −75 dBm).

In some implementations, the network computing device 100 may determine whether an entity-side SNR value associated with the entity computing device 400 satisfies a static SNR threshold value (e.g., at least 15 dB) and/or determine whether a network computing device-side SNR value associated with the network computing device 100 satisfies the static SNR threshold value (e.g., at least 15 dB).

In some implementations, the network computing device 100 may determine whether both the static RSSI threshold values and the static SNR threshold values are satisfied.

In some implementations, the network computing device 100 may determine whether an entity-side RSSI value associated with the entity computing device 400 satisfies a dynamic signal strength threshold value (e.g., as determined according to the method described with respect to FIG. 3) and/or determine whether a network computing device-side RSSI value associated with the network computing device 100 satisfies the dynamic signal strength threshold value.

If the signal strength condition is met, the method continues to operation 2040. If the signal strength condition is not met, the request by the entity computing device 400 to be connected to the network may be rejected and the method may end.

At operation 2040 the method includes, in response to determining the signal strength associated with the entity computing device 400 satisfies the signal strength condition (satisfies the signal strength threshold value), determining, by the network computing device 100, one or more network conditions associated with the network (e.g., a first network condition).

For example, the first network condition may correspond to a channel utilization condition. For example, the network conditions determiner 133 may be configured to determine the channel utilization condition of the network.

At operation 2050, the method includes determining, by the network computing device 100, whether the first network condition associated with the network is satisfied. In some implementations, the network computing device 100 may determine whether the channel utilization associated with the network is less than a channel utilization threshold value (e.g., lower than 30%, lower than 50%, lower than 70%, etc.).

If the first network condition is met, the method continues to operation 2060. If the first network condition is not met, the request by the entity computing device 400 to be connected to the network may be rejected and the method may end.

At operation 2060 the method includes, in response to determining the first network condition is satisfied, determining, by the network computing device 100, one or more other network conditions associated with the network (e.g., a second network condition).

For example, the second network condition may correspond to a backhaul utilization condition. For example, the network conditions determiner 133 may be configured to determine the backhaul utilization condition of the network.

At operation 2070, the method includes determining, by the network computing device 100, whether the second network condition associated with the network is satisfied. In some implementations, the network computing device 100 may determine whether the backhaul utilization associated with the network is less than a backhaul utilization threshold value (e.g., lower than 30%, lower than 50%, lower than 70%, etc.). In some implementations, the network computing device 100 may determine the backhaul utilization associated with the network is satisfied when the throughput rate is greater than a throughput threshold value (more than 35 megabits per second, 100 megabits per second, 150 megabits per second, 2 gigabytes per second, etc.).

If the second network condition is met, the entity computing device 400 may be admitted to the network and the method may end. If the second network condition is not met, the request by the entity computing device 400 to be connected to the network may be rejected and the method may end.

In some implementations, additional network conditions may be evaluated before determining whether to admit the entity computing device 400 to the network. For example, if the second network condition is met, the method may continue to determine whether a third network condition (e.g., a number of computing devices connected to the network condition) is satisfied, and admitting the entity computing device 400 to the network if the third network condition is satisfied or rejecting the network admission request if the third network condition is not satisfied. Other network conditions can be evaluated in a similar manner.

Referring to FIG. 3, an example computer implemented method 3000 for determining a dynamic signal strength threshold value is illustrated, according to example embodiments of the disclosure. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Referring to FIG. 3, at operation 3010 the method 3000 includes the network computing device 100 determining a noise floor associated with a network. For example, the signal strength threshold determiner 135 may be configured to determine the noise floor level.

At operation 3020 the method includes determining, by the network computing device 100 (e.g., the signal strength threshold determiner 135), a first candidate signal strength threshold value based on the noise floor and a SNR value. For example, the first candidate signal strength threshold value may be calculated according to a difference between the current noise floor value (in dBm) and the SNR value (in dB). For example, if the noise floor value is –80 dBm and the SNR value is 15 dB, the derived threshold value may be –65 dBm. In some implementations, the SNR value may be a reference or administratively configured SNR value (e.g., 15 dB, 20 dB, 25 dB, etc.). In some implementations, the SNR value may be the highest value between a current or real-time SNR value associated with the entity computing device and a current or real-time SNR value associated with the network computing device.

At operation 3030 the method includes determining, by the network computing device 100 (e.g., the signal strength threshold determiner 135), a second candidate signal strength threshold value based on a configured RSSI value. For example, the configured RSSI threshold value may be a reference or administratively configured static RSSI value (e.g., –80 dBm, –70 dBm, –67 dBm, etc.).

At operation 3040 the method includes, setting, by the network computing device 100 (e.g., the signal strength threshold determiner 135), the (dynamic) signal strength threshold value to a lowest absolute value between the first candidate signal strength threshold value and the second candidate signal strength threshold value.

For example, if the derived threshold value is –80 dBm (–95 dB noise floor and 15 dB SNR) and the second candidate signal strength threshold value is –75 dBm, then the signal strength threshold determiner 135 may be configured to set the signal strength threshold value to –75 dBm, which is the lowest absolute value between the first candidate signal strength threshold value and the second candidate signal strength threshold value. For example, if the derived threshold value is –65 dBm (–80 dB noise floor and 15 dB SNR) and the second candidate signal strength threshold value is –75 dBm, then the signal strength threshold determiner 135 may be configured to set the signal strength threshold value to –65 dBm, which is the lowest absolute value between the first candidate signal strength threshold value and the second candidate signal strength threshold value.

FIGS. 5A-5B are example illustrations including tables which depict example admission decisions of a network computing device, according to example embodiments of the disclosure.

In FIG. 5A, table 5110 includes threshold values 5112 which may be stored at the network computing device 100 in the one or more memory devices 120. The threshold values 5112 may be used by the admissions determiner 137 for determining whether to admit an entity computing device 400 to a network. In the example of FIG. 5A, the dynamic signal strength threshold value is –65 dBm, the channel utilization threshold value is 50%, the backhaul utilization threshold value is 50%, and the device count threshold value is 20. As shown in FIG. 5A, among the entities 5122 from table 5120, only entity 1 would be admitted to the network while the remaining entities' network admission request would be rejected.

In FIG. 5B, table 5210 includes threshold values 5212 which may be stored at the network computing device 100 in the one or more memory devices 120. The threshold values 5212 may be used by the admissions determiner 137 for determining whether to admit an entity computing device 400 to a network. In the example of FIG. 5B, a static RSSI threshold value is –75 dBm, the channel utilization threshold value is 50%, the backhaul utilization threshold value is 50%, and the device count threshold value is 20. As shown in FIG. 5B, entity 5222 (Entity 6) from table 5220 would be admitted to the network.

For purposes of comparison, assuming that a noise floor level of –80 dBm exists in the network environment and the SNR threshold value corresponds to 15 dB, a derived threshold value may correspond to –65 dBm. If the configured static RSSI threshold value is –75 dBm, then the signal strength threshold value may be set to the dynamic signal strength threshold value which is –65 dBm, as is the case in FIG. 5A. On the other hand, if a static RSSI threshold value is used under the same network environment conditions for a signal strength threshold value (instead of the dynamic signal strength threshold value), then the value of –75 dBm may be set, as is the case in FIG. 5B. Accordingly, when a signal strength associated with the entity computing device 400 is –74 dBm, the network computing device 100 may admit Entity 6 as depicted in FIG. 5B based on the static RSSI threshold value of –75 dBm, while the network computing device 100 may reject Entity 2 as depicted in FIG. 5A based on the dynamic signal strength threshold value of –65 dBm. Thus, Entity 2 (e.g., user equipment) may avoid suffering a poor network experience by being connected to a network which is impacted by poor network conditions (e.g., caused by excessive noise in the network environment) while Entity 6 has a poor network experience, as indicated in the table 5220. By setting the signal strength threshold value to a more stringent requirement in a noisy environment (by taking into account current noise levels), an entity computing device is not admitted unless the signal strength associated with entity computing device is suffi- ciently high, increasing the likelihood of a good or positive network experience, as is the case for Entity 1 in FIG. 5A.

In addition, the network computing device 100 further considers other network conditions including channel utilization, backhaul utilization, and the number of devices connected to the network, to further increase the likelihood of a good or positive network experience by the entity computing device once connected to the network.

The computer-readable media (e.g., non-transitory computer-readable media) may include, alone or in combination with the programming instructions, data files, data structures, and the like. Examples of non-transitory computer-readable media include magnetic media such as hard disks, floppy disks, and magnetic tape; optical media such as CD ROM disks, Blue-Ray disks, and DVDs; magneto-optical media such as optical discs; and other hardware devices that are specially configured to store and perform program instructions, such as semiconductor memory, read-only memory (ROM), random access memory (RAM), flash memory, USB memory, and the like. Examples of program- ming instructions include both machine code, such as pro- duced by a compiler, and files containing higher level code that may be executed by the computer using an interpreter. The programming instructions may be executed by one or more processors (e.g., one or more processors 110 and/or one or more processors 410). The described hardware devices may be configured to act as one or more software modules in order to perform the operations of the above- described examples, or vice versa. In addition, a non- transitory computer-readable storage medium may be dis- tributed among computer systems connected through a network and computer-readable codes or programming instructions may be stored and executed in a decentralized manner. In addition, the non-transitory computer-readable storage media may also be embodied in at least one appli- cation specific integrated circuit (ASIC) or Field Program- mable Gate Array (FPGA).

While the disclosure has been described with respect to various examples, each example is provided by way of explanation, not limitation of the disclosure. For example, features illustrated or described as part of one example can be used with another example to yield a still further example. Thus, it is intended that the disclosure covers such alterations, variations, and equivalents. Individuals will rec- ognize improvements and modifications to the examples described in this disclosure. All such improvements and modifications are considered within the scope of the con- cepts disclosed herein and the claims that follow.

What is claimed is:

1. A method, comprising:

receiving, by a network computing device, a request from an entity computing device for admission to a network;

determining, by the network computing device, whether a signal strength associated with the entity computing device satisfies a signal strength threshold value;

in response to determining the signal strength associated with the entity computing device satisfies the signal strength threshold value, determining, by the network computing device, whether one or more network con- ditions associated with the network are satisfied;

in response to determining the one or more network conditions associated with the network are satisfied, admitting, by the network computing device, the entity computing device to the network; and dynamically adjusting the signal strength threshold value by:

determining a current noise floor level associated with the network;

determining a first candidate signal strength threshold value which is calculated by adding a signal-to-noise ratio (SNR) value to the current noise floor level;

determining a second candidate signal strength thresh- old value based on a configured received signal strength indicator (RSSI) value; and setting the signal strength threshold value to one of the first candidate signal strength threshold value and the second candidate signal strength threshold value, according to which of the first candidate signal strength threshold value and the second candidate signal strength threshold value has a lowest absolute value.

2. The method of claim 1, wherein the one or more network conditions associated with the network include one or more of a channel utilization condition, a number of computing devices connected to the network condition, and a backhaul utilization con- dition.

3. The method of claim 2, wherein determining, by the network computing device, whether the one or more net- work conditions associated with the network are satisfied comprises:

determining whether a channel utilization associated with the network is less than a channel utilization threshold value;

determining whether a backhaul utilization associated with the network is less than a backhaul utilization threshold value; and determining whether a number of computing devices connected to the network is less than a device count threshold value.

4. The method of claim 1, wherein when the signal strength threshold value is dynamically adjusted to the second candidate signal strength threshold value, determin- ing, by the network computing device, whether the signal strength associated with the entity computing device satis- fies the signal strength threshold value comprises:

determining whether a RSSI associated with the entity computing device is less than or greater than the configured RSSI value.

5. The method of claim 1, wherein the SNR value is a configured SNR value.

6. The method of claim 1, wherein the SNR value is a highest value between a SNR value associated with the entity computing device and a SNR value associated with the network computing device.

7. The method of claim 1, further comprising:

in response to determining the signal strength associated with the entity computing device satisfies the signal strength threshold value, determining, by the network computing device, whether one or more network con- ditions associated with a further network are satisfied;

in response to determining the one or more network conditions associated with the network are satisfied and the one or more network conditions associated with the further network are satisfied, ranking each of the net- work and the further network, by the network comput- ing device, based on the one or more network conditions associated with the network and the one or more network conditions associated with the further network; and admitting, by the network computing device, the entity computing device to the network when the network is higher ranked than the further network.

8. A network computing device, comprising:

at least one memory configured to store instructions; and at least one processor configured to execute the instructions stored in the at least one memory to:

receive a request from an entity computing device for admission to a network;

determine whether a signal strength associated with the entity computing device satisfies a signal strength threshold value;

in response to determining the signal strength associated with the entity computing device satisfies the signal strength threshold value, determine whether one or more network conditions are satisfied;

in response to determining the one or more network conditions are satisfied, admit the entity computing device to the network; and dynamically adjust the signal strength threshold value by:

determining a current noise floor level associated with the network;

determining a first candidate signal strength threshold value which is calculated by adding a signal-to-noise ratio (SNR) value to the current noise floor level;

determining a second candidate signal strength threshold value based on a configured received signal strength indicator (RSSI) value; and setting the signal strength threshold value to one of the first candidate signal strength threshold value and the second candidate signal strength threshold value, according to which of the first candidate signal strength threshold value and the second candidate signal strength threshold value has a lowest absolute value.

9. The network computing device of claim 8, wherein the one or more network conditions associated with the network include one or more of a channel utilization condition, a number of computing devices connected to the network condition, and a backhaul utilization condition.

10. The network computing device of claim 9, wherein to determine whether the one or more network conditions associated with the network are satisfied, the at least one processor is configured to:

determine whether a channel utilization associated with the network is less than a channel utilization threshold value;

determine whether a backhaul utilization associated with the network is less than a backhaul utilization threshold value; and determine whether a number of computing devices connected to the network is less than a device count threshold value.

11. The network computing device of claim 8, wherein when the signal strength threshold value is dynamically adjusted to the second candidate signal strength threshold value, to determine whether the signal strength associated with the entity computing device satisfies the signal strength threshold value, the at least one processor is configured to:

determine whether a RSSI associated with the entity computing device is less than or greater than the configured RSSI value.

12. The network computing device of claim 8, wherein the SNR value is a configured SNR value.

13. The network computing device of claim 8, wherein the SNR value is a highest value between a SNR value associated with the entity computing device and a SNR value associated with the network computing device.

14. The network computing device of claim 8, wherein the at least one processor is configured to:

in response to determining the signal strength associated with the entity computing device satisfies the signal strength threshold value, determine whether one or more network conditions associated with a further network are satisfied;

in response to determining the one or more network conditions associated with the network are satisfied and the one or more network conditions associated with the further network are satisfied, rank each of the network and the further network based on the one or more network conditions associated with the network and the one or more network conditions associated with the further network; and admit the entity computing device to the network when the network is higher ranked than the further network.

15. A non-transitory computer-readable storage medium that includes executable instructions configured to cause one or more processor devices of a network computing device to:

receive a request from an entity computing device for admission to a network;

determine whether a signal strength associated with the entity computing device satisfies a signal strength threshold value;

in response to determining the signal strength associated with the entity computing device satisfies the signal strength threshold value, determine whether one or more network conditions are satisfied;

in response to determining the one or more network conditions are satisfied, admit the entity computing device to the network; and dynamically adjust the signal strength threshold value by:

determining a current noise floor level associated with the network;

determining a first candidate signal strength threshold value which is calculated by adding a signal-to-noise ratio (SNR) value to the current noise floor level;

determining a second candidate signal strength threshold value based on a configured received signal strength indicator (RSSI) value; and setting the signal strength threshold value to one of the first candidate signal strength threshold value and the second candidate signal strength threshold value, according to which of the first candidate signal strength threshold value and the second candidate signal strength threshold value has a lowest absolute value.

16. The non-transitory computer-readable storage medium of claim 15, wherein the SNR value is a configured SNR value, or the SNR value is a highest value between a SNR value associated with the entity computing device and a SNR value associated with the network computing device.

* * * * *